3,591,692
ANTI-INFLAMMATORY COMPOSITIONS CONTAINING HALOGENATED HETEROCYCLIC ACIDS AND METHODS OF USING THEM
Blaine M. Sutton, Hatboro, Pa., assignor to Smith Kline & French Laboratories, Philadelphia, Pa.
No Drawing. Continuation-in-part of application Ser. No. 524,828, Feb. 3, 1966. This application June 4, 1968, Ser. No. 734,215
Int. Cl. A61k 27/00
U.S. Cl. 424—247
9 Claims

ABSTRACT OF THE DISCLOSURE

Pharmaceutical compositions containing dosage units of compounds of the formula:

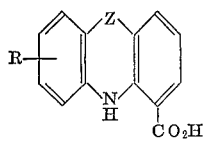

in which R is a halogen such as fluoro, bromo or chloro or a trifluoromethyl and Z is sulfur or oxygen, have anti-inflammatory activity. The active ingredients are prepared by a Smiles rearrangement for the phenothiazine series (when Z is sulfur) or a ring closure of a 3-(2'-acylaminophenoxy)-2-chlorobenzoic acid for the phenoxazine series (when Z is oxygen).

RELATED APPLICATIONS

This aplication is a continuation-in-part of Ser. No. 524,828, filed Feb. 3, 1966 issued as U.S. 3,475,427 on Oct. 28, 1969 as well as of Ser. No. 551,562, filed May 20, 1966 now allowed but not yet issued, the latter being in turn a continuation-in-part of Ser. No. 413,974 filed Nov. 25, 1964 now abandoned.

This invention comprises novel pharmaceutical compositions having biological activity, especially anti-inflammatory activity, as well as methods for producing anti-inflammatory activity in subjects in need of treatment. The active ingredients in the compositions and methods of this invention are novel and have the following structural formula:

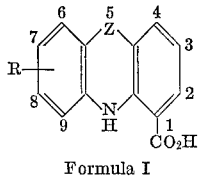

Formula I in which R is trifluoromethyl or halogen such as fluoro, bromo or chloro; and Z is sulfur or oxygen. R may be in any of the 6–9 positions, but is preferably trifluoromethyl at the 8 position. The preferred parent compound is 8-trifluoromethylphenothiazine-1- carboxylic acid. The term halo as used herein is meant to include trifluoromethyl, chloro, fluoro or bromo.

The active ingredients used in this invention are prepared as described in my above-noted related applications. Briefly, the phenothiazines (when Z is sulfur) most conveniently are prepared as follows.

A stirred mixture of 0.1 mole of 2-amino-halothiophenol hydrochloride, 0.1 mole of 2-bromo-3-nitrobenzoic acid and 0.45 mole of potassium carbonate in 200 ml. of dimethylformamide is refluxed for about six hours. The reaction mixture is poured into several volumes of ice and water, is filtered and the filtrate is acidified with glacial acetic acid. Solid product is removed and recrystalized for example from toluene.

8-trifluoromethylphenothiazine carboxylic acid, M.P. 242–245° C.;
7-trifluoromethylphenothiazine-1-carboxylic acid, M.P. 282–283° C.;
8-chlorophenothiazine-1-carboxylic acid, M.P. 280–282° C.;
8-fluorophenothiazine-1-carboxylic acid, M.P. 250–252° C.;
6-trifluoromethylphenothiazine-1-carboxylic acid, M.P. 260.5° C.

The phenoxazines (when Z is oxygen) are usually prepared as follows.

A mixture of 0.88 mole of 2-chloro-3-(2'-formamido-X'-halophenoxy)-benzoic acid, 14.75 g. of potassium carbonate, 1.8 g. of copper powder and 450 ml. of dimethyl formamide is refluxed for two hours under nitrogen. The hot mixture is filtered into several volumes of hot water and acidified. The crude X-halophenoxazine-1-carboxylic acid is isolated by cooling, separating then crystallizing such as from acetonitrile.

8-trifluoromethylphenoxazine-1-carboxylic acid, M.P. 263–265° C.;
7-trifluoromethylphenoxazine-1-carboxylic acid, M.P. 238–239° C.;
6-chlorophenoxazine-1-carboxylic acid, M.P. 283–285° C.;
7-chlorophenoxazine-1-carboxylic acid, M.P. 290–291° C.;
8-chlorophenoxazine-1-carboxylic acid, M.P. 276–277° C.;
8-fluorophenoxazine-1-carboxylic acid, M.P. 264–265° C.;
7-fluorophenoxazine-1-carboxylic acid, M.P. 248–250° C.;
9-trifluoromethylphenoxazine-1-carboxylic acid, M.P. 260–261° C.

Also included in this invention are the nontoxic salt or oxide derivatives of the compounds represented above. The nontoxic salts of the carboxylic acids of Formula I with pharmaceutically acceptable organic or inorganic bases for example the ammonium, ethanolamine, or the alkali metal salts including potassium, sodium or calcium salts may be used equivalently with the acids themselves. Such salt derivatives are prepared by standard reactions well-known to the skilled chemist, such as reacting the acid with a standard alkali or amine base in neutral solution or with an active alkali metal itself.

The oxide derivatives are prepared by coventional chemical means for example the phenothiazine sulfoxides by using m-chloroperbenzoic acid or the sulfones by 30% hydrogen peroxide.

The activity which is the basis of this invention is due to the basic structure of Formula I not to any salt or derivative form. The dosage units given hereafter are all based on the parent structures.

The compositions of this invention are of particular utility for their biological activity, for example, for various anti-inflammatory, antipyretic, antiviral and analgetic (in pressure based tests) activities. Certain of these compounds also have anthelmintic, antitubercular and antifungal activity, for example as do the phenoxazines disclosed by French Pat. No. 1,336,070.

The anti-inflammatory activity of these compositions is particularly unexpected and of great utility. The compounds are administered internally either subcutaneously or preferably orally to a subject in need of treatment in a nontoxic amount sufficient to induce the desired anti-inflammatory activity. Often the compound is administered in unit doses such as from about 5 mg. to 250 mg. from one to five times daily. Most conveniently, the compound is combined with a standard pharmaceutical filler using methods common to the art and this administered orally, for example in a capsule, tablet, troche, unit dose solution or suspension, or parenterally as a sterile solution or suspension. Specific examples of such preparations are presented hereafter.

One of the unexpected aspects of this discovery is the relatively low incidence of side effects especially in the ulcerogenic area common with the few non-steroidal anti-inflammatory agents known in the prior art. The claimed compounds also have little central nervous system activity at effective anti-inflammatory doses.

The anti-inflammatory activity of the compositions and methods of this invention may be demonstrated most conveniently by the filter paper granuloma test in rats [R. Meier et al., Experienta, 6, 469; Abstracts, XVI, 228 (1955)] or the delay in UV-induced erythema in guinea pigs [Winder et al., Arch. int. Pharmacodyn., 116, 261 (1958)].

As examples of the anti-inflammatory activity the following test results were obtained:

8-trifluoromethylphenoxazinyl-1-carboxylic acid

Filter paper granuloma, active at 10 mg./kg. subcutaneously in rats.

Ultraviolet-induced erythema, active at 40.0 mg./kg. orally in guinea pigs.

8-chlorophenoxazinyl-1-carboxylic acid

Filter paper granuloma, active at 20 mg./kg. subcutaneously in rats.

Ultraviolet-induced erythema, active at 40 mg./kg. orally in guinea pigs.

7-trifluoromethylphenoxazinyl-1-carboxylic acid

Filter paper granuloma, active at 80 mg./kg. subcutaneously in rats.

8-trifluoromethylphenothiazine-1-carboxylic acid

Filter paper granuloma, active at 2.5–20 mg./kg. orally b.i.d. in rats.

Ultraviolet-induced erythema, active at 5–10 mg./kg. orally in guinea pigs ($ED_{50}$ 3.1 in solution).

Carrageenin paw edema test for anti-inflammatory activity, $ED_{50}$ 25 mg./kg. orally in rats.

Antipyretic yeast inflammatory test at 10 mg./kg. orally in rats.

D'Armour Smith analgesia at 80 mg./kg. orally in rats.

Writhing test for analgesia in rats, $ED_{50}$ 14.8 mg./kg. orally.

8-chlorophenothiazine-1-carboxylic acid

Filter paper granuloma, active at 20 mg./kg. subcutaneously in rats.

Ultraviolent-induced erythema, active at 40 mg./kg. orally in guinea pigs.

The method of this invention therefore comprises administering internally to a subject in need of treatment, either subcutaneously or preferably orally from about 5–250 mg., of a compound of Formula I in amounts sufficient to induce an anti-inflammatory effect but nontoxic to the subject. The dose ranges given herebefore, i.e., about 5–250 mg. from one to five times daily are most useful. The pharmaceutical unit compositions disclosed herein are conveniently used to practice this invention.

As an example of the use of these compositions and methods, five clinical investigators administered 8-trifluoromethylphenothiazine-1-carboxylic acid to 70 human patients at doses of 100 mg. q.i.d. over a period of one to three months. The patients were diagnosed in the osteroarthritic, rheumatoid arthritic or gouty arthritic categories. Only 54 patients could be evaluated over the whole test. Of these, 36 showed significant improvement due to the anti-inflammatory activity of the compositions of this invention.

This invention has especially significant utility in the veterinary area in various abnormal conditions such as lameness, inflammation, tendonitis, etc., all of which may be categorized as arthritic conditions. Nineteen investigators treated 188 dogs with compositions containing 8-trifluoromethylphenothiazine-1-carboxylic acid. Evaluations showed excellent to good improvement in 131 dogs. Broken down 104/140 of arthritis disorders, 25/37 of joint inflammation and 2/4 miscellaneous demonstrated good, often dramatic, response in this study. Daily doses ranged from 1–45 mg. daily but most generally used was 5 mg. three times daily. The average dog weighs about 30 pounds. No significant limiting side effects were observed.

In horses, this compound is most effective at about 500 mg. to 1 g. a day for tendonitis or lameness.

While these pharmaceutical compositions are prepared by known techniques of the art, the following examples are exemplary of this invention. The amount of active ingredient may be varied as to the relative activity of the chemical ingredient and the weight of the subject. However the weight ratio of the compound to body weight in the veterinary area has not been found as critical as with drugs in other therapeutic areas.

EXAMPLE 1

|  | G. |
|---|---|
| 8-trifluoromethylphenothiazine-1-carboxylic acid | 125 |
| Terra alba | 1,402 |
| Microcrystalline cellulose | 812 |
| Starch | 3,300 |
| Polyvinylpyrrolidone | 375 |
| Iron oxide (brown) | 12 |
| Iron oxide (yellow) | 6 |
| Sodium lauryl sulfate | 31 |

The compound and fillers are mixed and screened. The polyvinylpyrrolidone and sulfate are dissolved in 1 liter of water then used for wet granulation. The granulation is screened and dried then screened. The dry granulation with lubricant added is compressed with the conventional tablet press to give 5 ml./tablet compositions.

One tablet is then administered three times daily to an osteroarthritic dog until remission of symptons.

EXAMPLE 2

|  | G. |
|---|---|
| 9-trifluoromethylphenothiazine-1-carboxylic acid | 4,100 |
| Sodium lauryl sulfate | 82 |
| Magnesium stearate | 82 |
| Lactose | 7,175 |

The ingredients are mixed, screened and filled into a No. 2 capsule to give 100 mg./capsules, compositions.

One capsule is administered to an osteroarthritic patient four times daily.

EXAMPLE 3

8-trifluoromethylphenothiazine-1-carboxylic acid (200 mg.) micronized is suspended in water with tragacanth then filled into an ampoule which is sterilized. The injectable preparation is then administered subcutaneously to the arthritic portion of the patient.

What is claimed is:
1. A pharmaceutical composition having anti-inflammatory activity in unit dosage form containing from about 5–250 mg. of a compound of the formula:

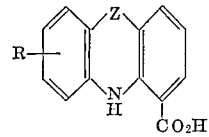

in which Z is sulfur; and R is trifluoromethyl, chloro, fluoro or bromo combined with a pharmaceutical carrier.

2. A composition of claim 1 in which the substituent R is chloro or trifluoromethyl in the 7 or 8 position.

3. A composition of claim 1 in which R is 8-trifluoromethyl.

4. A composition of claim 3 in which about 5 mg. of active ingredient is present.

5. The method of producing anti-inflammatory activity comprising internally administering to a subject in need of such treatment a pharmaceutical composition containing an effective but nontoxic quantity of a compound of the formula:

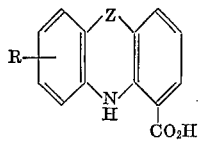

in which Z is sulfur; and R is trifluoromethyl, chloro, fluoro or bromo combined with a pharmaceutical carrier.

6. The method of claim 5 in which the administration is orally.

7. The method of claim 5 in which the compound is 8-trifluoromethylphenothiazine-1-carboxylic acid.

8. The method of claim 7 in which from about 5–250 mg. of the active ingredient is administered from one to five times daily.

9. The method of claim 7 in which about 5 mg. is administered from one to five times daily orally to an arthritic dog.

References Cited

UNITED STATES PATENTS

| | | | |
|---|---|---|---|
| 3,074,939 | 1/1963 | Davis | 260—243 |
| 3,334,092 | 8/1967 | Driscoll | 260—243 |
| 3,341,534 | 9/1967 | Driscoll | 260—243 |

STANLEY J. FRIEDMAN, Primary Examiner

U.S. Cl. X.R.

424—248